United States Patent
Muller

[15] 3,686,397
[45] Aug. 22, 1972

[54] PARENTERAL IRON PREPARATIONS
[72] Inventor: Arthur Muller, 100 B, St. Georgenstrasse, St. Gallen, Switzerland
[22] Filed: May 18, 1970
[21] Appl. No.: 37,474

Related U.S. Application Data

[63] Continuation of Ser. No. 716,638, March 27, 1968, abandoned, which is a continuation-in-part of Ser. No. 447,946, April 14, 1965, abandoned.

[52] U.S. Cl. ................................. 424/180, 424/295
[51] Int. Cl. ............................................. A61k 27/00
[58] Field of Search ............................ 424/180, 295

[56] References Cited

UNITED STATES PATENTS

| | | | |
|---|---|---|---|
| 2,885,393 | 5/1959 | Herb | 424/180 X |
| 3,022,221 | 2/1962 | Floramo | 424/180 |
| 3,070,506 | 12/1962 | Linkenheimer et al | 424/180 X |

FOREIGN PATENTS OR APPLICATIONS 659,420   3/1903   Canada

*Primary Examiner*—Jerome D. Goldberg
*Attorney*—Christen and Sabol

[57] ABSTRACT

Novel, therapeutically-useful trivalent iron complexes electrophoretically exhibiting a homogeneous negative charge may be prepared by treating reactive trivalent iron with a complex forming agent consisting of sorbitol, gluconic acid and certain oligosaccharides in particular proportions and amounts.

4 Claims, 2 Drawing Figures

INVENTOR

ARTHUR MULLER

Christen, Sabol & O'Brien

ATTORNEYS

PARENTERAL IRON PREPARATIONS

This is a continuation of application Ser. No. 716,638 filed March 27, 1968, now abandoned which was a Continuation-In-Part of Parent Application, Ser. No. 447,946, filed Apr. 14, 1965, now abandoned.

The present invention is related to new therapeutically useful parenteral readily absorbed preparations of iron and, more particularly, preparations of iron containing a complex of trivalent iron and to processes for the production thereof.

Parenteral preparations comprising complexes of trivalent iron are already known. For instance, the saccharates of iron are produced by using sugar as a complex forming agent and these products are widely used for intravenous administration. However, they cannot be readily used for intramuscular administration because their aqueous solutions are highly alkaline. The iron dextrins and iron dextrans may be administered intramuscularly. However, these products have a high average molecular weight ranging generally between 100,000 and 200,000 and, therefore, absorption in the human and animal body is incomplete. Furthermore, the administration of these products often produces an undesirable discoloration at the injection site. Complex compounds of trivalent iron have been prepared from ferric hydroxide and a mixture of gluconic acid and sorbitol. Thus, one mol of ferric hydroxide reacted with at least one half mol of gluconic acid and at least one half mol of sorbitol (German Pat. No. 862,482) are known, but these complexes do not have sufficient stability. Recently, complex compounds of iron have been produced in a low molecular embodiment (average particle weight about 5,000) using a hexitol such as sorbitol and a hydroxycarboxylic acid such as citric or gluconic acid. These products are stabilized by means of dextrins having an average molecular weight of about 1,000 to 5,000 (Canadian Pat. No. 659,420) and are rapidly absorbed by animal bodies. However, about 35 percent of the iron administered is excreted within short time by urination through the kidneys (see A. Pringle et al., Lancet 1962, II, p. 7259). Iron excreted in this manner has no curing effect on the body and the advantage of rapid absorption is offset by the substantial amount of iron which is unutilized because of excretion. Furthermore, the rather high toxicity of these products; $LD_{50}$ in white mice ranges to 36 mg. Fe(III)/kg. upon subcutaneous administration, 50 mg. Fe(III)/kg. upon intraperitoneal administration, and 35 mg.Fe(III)/kg. upon intravenous administration (compare the first line of page 11 of Canadian Pat. No. 659,420) severly restricts the useful dosage. Possibly, this high toxicity is caused by the fact that the products do not have a uniform composition and contain considerable amounts of readily ionizable iron which have a toxic effect in the human body. According to Canadian Pat. No. 659,420, the hydroxycarboxylic acid and the hexitol component are bound to the iron atom while the dextrin is present in a free form and serves as a stabilizing agent for the insufficiently stable dispersion of the complex salt in water. When this product is subjected to electrophoresis, about 6 percent of the iron contained therein migrates to the anode faster than the remaining amount of iron, i.e., the product contains ionic iron and is not a non-ionic uniform complex in electrophoresis (see Canadian Pat. No. 659,420, page 7, lines 23–29).

Therefore, it is an object of the present invention to provide new therapeutically useful parenteral preparations of iron comprising readily absorbed complexes of trivalent iron with a mixture of sorbitol, gluconic acid and certain oligosaccharides as the complex forming agents and which complexes of trivalent iron are non-ionic, have a uniform composition and a low toxicity while at the same time the rate of absorption and effectiveness of the iron administered to the human of animal body is improved.

Further objects to the present invention and advantages thereof will become apparent as the description proceeds.

Figure 1:
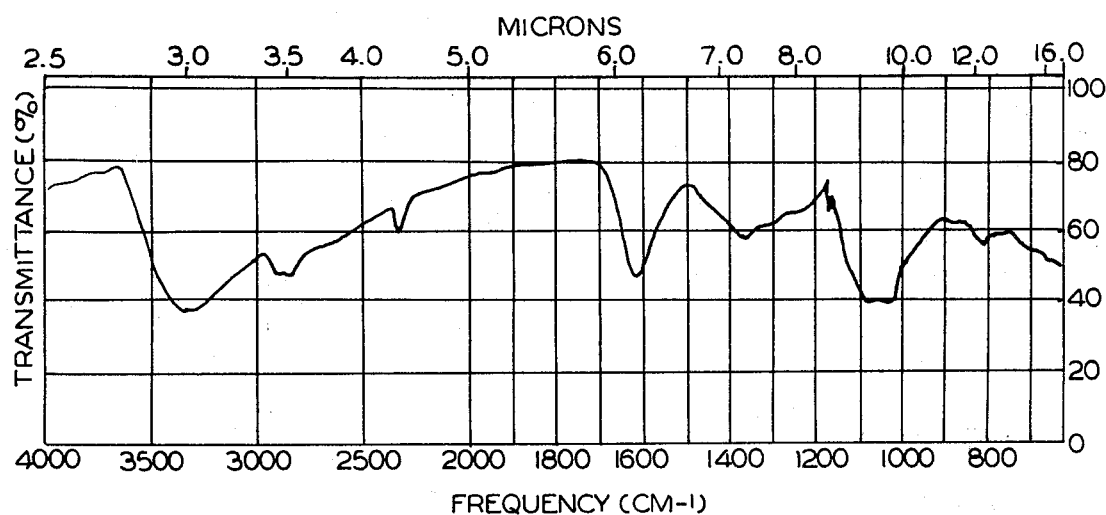
FIG. 1 is an infrared spectograph of the product of Example 3.

The new therapeutically useful preparations of iron according to the present invention comprise a non-ionic (electrophoretically uniform) complex of trivalent iron supplied a ferric hydroxide with a complex forming agent consisting of sorbitol, gluconic acid and certain oligosaccharides (polyglucoses) in very particular proportions and amounts. The complex forming agent consist of sorbitol, gluconic acid and, as third component, a dextrin of dextran having an average intrinsic viscosity of about 0.01 to about 0.025 at 25° C. and an average molecular weight of from about 500 to about 1,200; or a hydrogenated dextrin or dextran having said average intrinsic viscosity and said average molecular weight and being substantially non-reducing to the Somogyi reagent; or mixtures thereof, in a molar ratio of about 0.4 mol of sorbitol : about 0.3 mol of gluconic acid : 0.3 mol of the above polyglucose calculated as anhydroglucose $C_6H_{10}O_5$. About 1 mol of said complex forming agent is present in the iron preparation according to the present invention per each mol of trivalent iron or ferric hydroxide.

The dextrans and dextrins of such an average molecular weight are obtained by known methods, such as by growing under carefully controlled conditions of temperature, appropriate organisms in a suitable nutrient medium containing a high proportion of sucrose or by controlled acid hydrolysis of native dextrans and dextrins or they may be obtained synthetically, as described for instance in U.S. Pat. No. 3,022,221 and Römpp Chemielexikon, 4th edition, 1958, column 1121–1122.

The hydrogenated dextrans and dextrins may be produced according to known methods, such as by subjecting a dextran or dextrin of the average molecular weight defined hereinabove to reaction with sodium boro-hydride in an aqueous medium or by catalytic hydrogenation as described for instance in U.S. Pats. Nos. 2,807,610 or 3,022,221 or in J.Am/Chem. Soc. 74 (1952), pgs. 2126–2127.

The Somogyi reagent is defined for instance in J. Biol. Chem. 70, 607 (1926).

The iron preparations according to the present invention are prepared by subjecting 1 mol of a compound of trivalent iron in a reactive form to reaction with about 2 mole of the complex forming agent defined above, as containing its ingredients in a molar ratio of about 1.15 mols of sorbitol : about 0.4 mols of gluconic acid : about 0.5 mol of polyglucose calculated as anhydroglucose $C_6H_{10}O_5$, in an aqueous medium and, after an alkali is added thereto until a pH of about 9.5 or somewhat above is reached, heating the resulting mixture. Complex preparation may be conducted both at an alkaline pH and at an acid pH, the latter is accomplished through the intermediate formation of an acid complex. Preferably, an alkali metal hydroxide, and usually sodium hydroxide is used as the alkali.

The word "about", as herein used, is to be understood in such a way that changes ranging to about ±20 percent in the ratio of the components of the complex forming agent among each other and in the ratio between the ferric hydroxide and the complex forming agent are allowable. The process according to the invention with the other respects should be conducted for fulfilling the objects of the invention in such a way that electrophoretically uniform, low molecular complexes are obtained wherein all of the three complex forming agents are bound in a complex form.

The trivalent iron compounds used as starting materials according to the present invention correspond to the trivalent iron compounds which have been used already in similar known processes. Preferably, ferric chloride is used as starting material which in the alkaline complex formation is converted into trivalent iron hydroxide (ferric hydroxide) by reaction with soda, sodium bicarbonate or aqueous sodium hydroxide and is further reacted with the complex forming agent in a freshly precipitated reactive form, preferably after being washed. The formation of the iron hydroxide is carried out according to known methods in such a way that its reactive polynuclear $\gamma$-form is formed to an extent as large as possible and the formation of its less reactive polynuclear $\alpha$-form is avoided. In the alkaline complex formation, the alkali, such as the aqueous sodium hydroxide, is added to the solution of the iron compound in an amount such that the acid produced from the iron compound is thereby neutralized and (after complete neutralization) an excess of about 0.25 mols of NaOH per 1 gram atom Fe remains in the reaction mixture. The pH-value of the reaction mixture should be at about 9–9.5 during the alkaline complex formation. During the reaction, a small amount of alkali is consumed and after the termination of the reaction it should be possible to determine 0.25 mols of NaOH by titration. When using $FeCl_3$ as a starting material, preferably 3.5 mols of NaOH are used per one mol of $FeCl_3$. In the alkaline complex formation, preferably the solution of the complex forming agent in water is placed in the reaction vessel and is heated to 60° C.; the solution of the iron compound, for instance the ferric chloride, and the aqueous sodium hydroxide are introduced into the reaction mixture as separate solutions (one solution of ferric chloride and the other solution of sodium hydroxide) in the calculated amount. Thus, the complex, as indicated by a clear solution, is very rapidly produced. Only during the final stage of the addition of both solutions are small amounts of precipitates noticeable and these are redissolved during the subsequent heating. After the addition of the solutions is completed, the reaction mixture is boiled for a period of about 5 to +minutes, preferably for about 30 minutes, to produce a clear solution with an increased degree of stabilization.

The formation of the complex of trivalent iron in an alkaline medium may be also conducted by placing a suspension of freshly precipitated and washed ferric hydroxide in a reaction vessel, adding the complex forming agents and the alkali necessary for controlling the pH-value thereto, and heating the reaction mixture to boiling until a clear solution is obtained.

Furthermore, the new complex preparation of iron according to the present invention may be produced by preparing an "acid complex" and converting the same into a complex of trivalent iron by heating the "acid complex" in an aqueous alkaline medium. The "acid complex" may, for instance, be prepared by adding aqueous sodium carbonate solution or sodium bicarbonate solution to an aqueous solution of ferric chloride and 2 mols of the above defined complex forming agent per each mol of ferric chloride slowly at room temperature such that the pH-value of the reaction solution rises to about 2.5. The color of the reaction mixture is thereby converted to a reddish brown. The formation of the acid complex is evidenced by adding methanol to a sample of the solution thus obtained, which produces a precipitate containing both iron and the complex forming agent; in contrast thereto, a solution of ferric chloride which does not contain the complex forming agent or a solution of the complex forming agent which does not contain ferric chloride does not produce a precipitate under equivalent conditions, i.e. the salt of iron or, respectively, the components of the complex forming agent in these essays remain in solution if a very large amount of methyl alcohol is added.

When increasing the pH-value of the solution of the acid complex obtained in the first step from 2.5 to about 9.5, which for instance may be accomplished by adding corresponding amounts of aqueous sodium hydroxide, a precipitate is formed at a pH of about 3 which redissolves almost completely, as the addition of the alkali metal hydroxide continues. This addition of sodium hydroxide from pH 2.5 is carried out at room temperature. After the pH of about 9.5 is reached, the reaction mixture is heated to boiling for a short period, immediately cooled again, brought to a pH-value of about 7.0 by the addition of a physiologically harmless acid such as preferably hydrochloric acid and is worked up.

The ratio between water and solid materials in the alkaline and in the acid procedure should be preferably controlled in such a way that 2 to 4 parts by weight of water are present per each part by weight of solid material.

The final products obtainable by the process of the present invention exhibit substantially improved properties over the prior art complexes. The gluconic acid present in the complex forming agent mixture, when used in accordance with the present invention, produces a complex having a good stability to heat both in neutral pH and in weakly acid pH ranges. This indicates that the content of gluconic acid produces a favorable thermostability as a result of the change of the isoelectric point. Too high a content of gluconic acid would decrease the stability of the complex and result in a higher toxicity of the complex salt. The sorbitol and particularly the oligosaccharide (polyglucose) favorably influence the formation of a uniform complex and thus decrease the toxicity and, respectively, increase the compatibility of the iron preparation in a very favorable manner. The high molecular weight oligosaccharides of the prior art produce ferric complexes with an undesirably large particle size which substantially restricts their absorption by animal and human bodies.

FIG. 1 is an infrared spectrograph of the product of Example 3 obtained by using a grating infrared spectrophotometer manufactured by Perkin Elmer 237 with potassium bromide discs (conc. 1.5 mg. of iron hexanehexol/250 mg. of KBr) at a fast scan speed. An evaluation of the spectrum is made as follows:

The valency oscillations of the hydroxy groups ($v$ – OH) between 3,300 and 3,400 cm$^{-1}$ indicate a strong association due to hydrogen bridges. The oscillation at a frequency of 1,615 cm$^{-1}$ is caused by the carboxy group (—COO$^-$) of the gluconic acid component. The absorptions at about 1,360 and 1,050 cm$^{-1}$ are due to deformation oscillations of primary and secondary ligand hydroxy groups. The low absorption at 820 cm$^{-1}$ indicates the existence of Fe-O-bondage.

Figure 2:
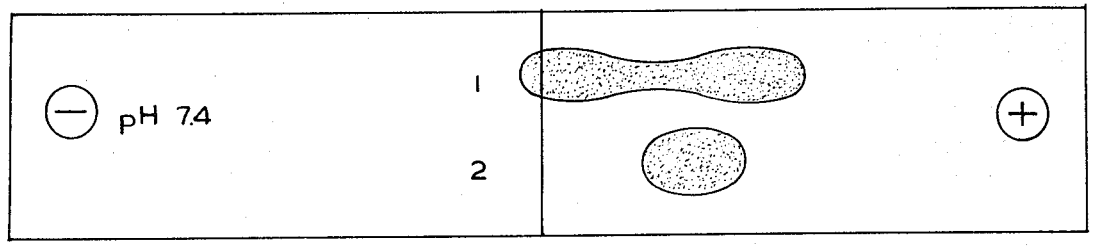
FIG. 2 is an electrophoretic comparison of the product prepared in Example 2 of the present application and a commercial product, JECTOFER, manufactured under Canadian Pat. No. 659,420 and identified as an iron sorbitol-citric acid complex with an average molecular weight of less than 5,000 wherein each cc of solution contains the equivalent of 50 mg. elemental iron and having a pH of 7.2 to 7.9.

The products of the present invention may be further identified by their uniform migration to the anode at a pH of 7.4 to 8.6 when subjected to electrophoretic testing. FIG. 2 represents a pictorial representation of the uniform migration of the products of the present invention 2 contrasted with the non-uniform migration of such prior art complexes 1 as those taught by Canadian Pat. No. 659,420. Electrophoresis testing is well known to those skilled in the art. I have found apparatus, such as the Elphor type, suitable for application of a current intensity of about 2.5 mA applied to test strips, such as Schleicher-Schnell No. 2043, having a sample of the solution to be tested thereon for a period of 4 to 16 hours suitable to identify the products of the present invention. The test strips of FIG. 2 were produced by the above procedure using 5 $\mu$l of buffered solutions containing about 3 volume per cent iron in the complex form to be tested in a buffered solution having a pH of 7.4 prepared by dissolving 41.2 g sodium diethyl barbiturate in 1,600 cc distilled water, adjusting the pH to 7.4 by the addition of 0.1 N HCl and diluting the solution to 2 liters. Since the known complex compounds with polymeric carbohydrate ligands, such as polyisomaltose (dextran), polymaltose (dextrin), polygalactose and derivatives thereof, for example polyhydrated dextran, dextran glycerol glycoside, carboxymethyl derivatives and carboxy derivatives exhibit a non-uniform positive charge by their migration, the complexes of the present invention exhibit a uniform negative charge, positive identification is possible.

Supplementary identification of the products of the present invention may be accomplished by methods well-known to those skilled in the art. For example, the iron may be determined by a positive Prussian Blue reaction after acidic hydrolysis of the complex. The organic components can be determined by paper chromatography procedures using the characteristic $R_f$ values thereof. One suitable procedure found is as follows: The iron is precipitated from an aqueous solution of the complex using hydrogen sulfide, separated by centrifugation and decanting the supernatant, which is heated to evaporate excess hydrogen sulfide. The solution is cooled and treated with an acidic form of sulfonic acid cation exchanger IR 120, which converts the sodium salt of gluconic acid to free gluconic acid. After vacuum drying, a one per cent weight-volume aqueous solution of the residue may be analyzed by the paper chromatography procedure described by L. H. Adcook, Analyst, Vol. 82 (1957), pages 427 to 434. Approximate $R_f$ values are sorbitol 0.07; gluconic acid (gluconic acid-lactone) 0.19 and hydrogenated oligomeric dextrin 0.01.

The complex preparations may be precipitated from their aqueous solutions by procedures known to those skilled in the art, such as by the addition of organic solvents miscible with water. The iron content of the dried preparations is about 21 to 26 percent. Clear aqueous solutions containing from 5 to 10 percent of iron may be prepared from the dry preparations without any difficulty. These solutions consistantly have a pH of 7.2 to 7.5 and are stable on sterilization in a current of steam.

The prior art iron complexes are easily distinguished by the difficulties encountered in preparing clear aqueous solutions and the lack of a desirable consistant pH in aqueous solution.

When tested pharmacologically and in the clinics, the preparations prepared in accordance with the present invention are well tolerated and highly effective in the treatment of iron deficiencies.

The mean lethal dose upon intramuscular injection of a solution of the complex containing 5 to 10 percent of trivalent iron to mice was about 350 mg. of Fe/kg. in a 10-days-test.

The mean lethal dose upon intramuscular injection of a solution of the complex containing 5 percent of trivalent iron to guinea-pigs in a 10-days-test was about 350 mg. of trivalent Fe per kg. Multiple intramuscular injections during 101 days with a total dose of 450 mg. of trivalent iron per kg. were well tolerated and did not affect the normal growth of the guinea pigs.

With rats suffering from lead poisoning anemia, the erythrocyte number increased upon intramuscular administration of the complex in a dose of 10 mg. of trivalent iron per kg. in comparison to check test animals. When administering single intramuscular dose of 2 ml. of the solution of the complex corresponding to 100 mg. of trivalent iron to suckling pigs on the 4the day after birth, an increase of the erythrocyte number from 4.6 to 6.9 Mio/cb.mm. and of the hemoglobin content from 10.4 to 11.9 g. per 100 ml. was observed on the 53rd day after birth.

In the clinical test the preparations according to the present invention showed to be effective and well tolerated. Upon intramuscular injection of the complex, the patients excreted by urination on an average only 10 percent of the iron amount administered.

No coloration at the site of injection appeared upon intramuscular injection of the preparations prepared in accordance with the present invention.

The absorption of the preparations was very good. The preparations were very quickly carried away from the site of intramuscular injection. Thus, for instance in rabbits, only 2.9 percent of the iron was found as residue in the place of injection after 4 days since intramuscular injection of 10 mg. of iron as complex per kg. of animal body. In piglets, the injected iron disappeared at the site of administration within few days after the injection of the complex.

From the above properties, the preparations prepared in accordance with the present invention produce a considerable advance in comparison to known iron preparations.

For instance, in comparison with the products produced in accordance with Canadian Pat. No. 659,420, the products of the present invention are non-ionic, electrophoretically uniform complex compounds containing all of the three components of the complex forming agent bound in a homogenous complex form thus avoiding components containing ionizable iron. The toxicity of the products produced in accordance with the present application is considerably lower than that of the products according to said Canadian Pat. No. 659,420. Furthermore, the amount of iron which is not used in the human body, i.e., which is excreted by urination through the kidneys, is much lower with the products of the present application than with the products of this Canadian patent. This advance is achieved by the particular ratios between the amounts of the components of the complex forming agent and of the iron and by the particular process conditions of the present invention.

The following examples serve to further illustrate the present invention without however limiting the same thereto:

EXAMPLE I

Forty-five g. of sodium borohydride are dissolved in water and added to a 10 percent w/v aqueous solution containing 1 kg. of a dextrin having an average molecular weight of about 1000 and an average intrinsic viscosity of 0.02.

The mixture is allowed to stand at room temperature for 5 hours with occasional stirring, and then is acidified with 30 percent acetic acid. The acidified mixture is passed successively through a column of a cation exchange resin and an anion exchange resin. Methyl alcohol is added to the thus de-ionized solution with stirring to give a solution containing 80 percent of methyl alcohol by volume. After standing for 24 hours at 25° C., the supernatant solution is decanted from the precipitated hydrogenated dextrin. The product is dried at 100° C. at atmospheric pressure for 1 hour, then at 100° C. in vacuum for 2 hours. The product is non-reducing to the Somogyi reagent. It has an average intrinsic viscosity of 0.02 at 25° C.

EXAMPLE II

Two hundred eighty four g. of sorbitol, 81 g. of sodium gluconate and 108 g. of the hydrogenated dextrin having an average molecular weight of about 1,000 and an average intrinsic viscosity of about 0.02, obtained as described in Example 1, are added to a suspension of 975 g. of ferric hydroxide (corresponding to 56 g. of iron) (freshly prepared by precipitation thereof from ferric chloride, $FeCl_3$ by means of a soda solution and washed until free of electrolytes) in 200 ml. of water with rapid stirring. The pH of the reaction mixture is brought to a value of 12 by the addition of 50 ml. of 10 N aqueous sodium hydroxide and is then heated to 80° C. Thereby, the iron hydroxide dissolves starting from 50° C., and at 80° C. a complete solution is obtained which is heated to boiling for 15 minutes. The pH of the cooled solution is brought to a value of 7.0 by the addition of hydrochloric acid and the iron complex is isolated therefrom by precipitation with methanol in a ratio of one part of the solution per 1.5 parts of 9percent methanol. The precipitate is filtered off and the complex is dried. The dried complex has an iron content of 25.7 percent and the dried product is a brown amorphous powder, very soluble in water, soluble in ethylene glycol and glycerol and insoluble in most other organic solvents. A clear aqueous red-brown solution containing 5 percent of iron is easily prepared by merely adding distilled water to this dried preparation and no filtration is necessary. This solution is used to fill ampoules and is then sterilized by heating the ampoules for 30 minutes in a current of steam. The pH of the aqueous solution is between 7.2 and 7.5. When subjecting the aqueous solution to electrophoresis at a pH of 7.2 or 8.6 the complex is electrophoretically homogenous and negatively charged.

EXAMPLE III

Forty two g. of sorbitol, 12 g. of sodium gluconate, and 16 g. of a hydrogenated oligomeric dextrin having an average molecular weight of about 1,000, and an average intrinsic viscosity of 0.02 are dissolved in such an amount of water to yield a solution of 25 g. The solution is heated to 60° C. 95 g. of 10 N aqueous sodium hydroxide and 184 g. of a 30 weight by weight percent aqueous solution of ferric chloride $FeCl_3$ ($d = 1.162$) are added simultaneously with rapid stirring in such a way that the reaction mixture always has a pH between 9.0 to 9.5. When proceeding in this way the ferric hydroxide is immediately dissolved. After the addition of the reaction components is terminated, the reaction mixture is heated to boiling for 20 minutes and then is cooled. Hydrochloric acid is added until a pH of 7.0 is reached, the solution is filtered and the iron hydroxide complex is isolated by precipitation with acetone in a ratio of one part of the solution per 1.5 parts of acetone and the isolated complex is dried. The dried brown amorphous complex has an iron content of 22.8 percent by weight, is very soluble in water and leaves no residue, thereby making filtration unnecessary. It is also soluble in ethylene glycol and glycerol and insoluble in most other organic solvents. The dried preparation is easily dissolved in water to yield a clear aqueous red-brown solution containing 10 percent of iron. The isoelectric point (iP) of this solution lies between pH 3.5 and 4.5 and when this solution is subjected to electrophoresis at a pH of 7.4 or 8.6, the product demonstrates an electrophoretically homogenous negative charge. Ampoules are filled with the solution and sterilized for 30 minutes in a current of steam. The pH of this solution is between 7.2 and 7.5.

EXAMPLE IV

A mixture of 42 g. of sorbitol, 12 g. of sodium gluconate, 16 g. of a hydrogenated oligomeric dextrin having an average molecular weight of about 800 and an average intrinsic viscosity of 0.015 and 30 g. of water is added to 184 g. of a 30 weight by weight percent aqueous solution of ferric chloride, $FeCl_3$, ($d = 1.162$) at room temperature and 140 ml. of a 20 weight per volume percent solution of soda is slowly added thereto with rapid stirring. The pH-value of the reaction mixture rises during the addition from 0.6 to 2.5 and the color thereof changes to reddish brown. Thereafter, 20.5 ml. of a 10 N aqueous sodium hydroxide solution are added, thus causing the pH to rise to 9.5. Starting from a pH value of 3, a ferric oxychloride complex is precipitated which almost completely is redissolved at room temperature during the further addition of the alkali hydroxide until a pH value of 9.5 is reached. The reaction mixture is heated to boiling, immediately thereafter cooled to room temperature and neutralized to a pH of 7.0 by the addition of hydrochloric acid and is worked up as described in Example 3. The iron content of the resulting brown amorphous powder is 26.0 percent. This dried product is very soluble in water and does not leave any insolubles when dissolved in water. It is furthermore soluble in ethylene glycol and glycerol and insoluble in most other organic solvents. When subjecting an aqueous solution to electrophoresis at a pH of 7.4 or 8.6 the complex exhibits electrophoretically a homogenous negative charge.

EXAMPLE V

When proceeding as described in Example II and using 108 g. of a dextrin having an average molecular weight of about 1,000 and an average intrinsic viscosity of about 0.02 in place of the hydrogenated dextrin product, a dry brown amorphous powder is obtained which contains 23.6 percent of trivalent iron. The dry powder is very soluble in water and forms a clear solution without leaving any insolubles. The pH of the aqueous solutions prepared from the dry powder lies between 7.2 and 7.5. When subjecting the aqueous solution to electrophoresis at a pH of 7.4 or 8.6, the complex demonstrates electrophoretically a homogenous negative charge. To produce aqueous solutions, one need only add the desired amount of water and filtration is unnecessary. Ampoules are filled with the aqueous solution, which is sterilized as described in Example II. The dextrin-fraction having an average intrinsic viscosity of about 0.02 is prepared by acid hydrolization and precipitation of the neutralized solution with methanol of a dextrin having an average intrinsic viscosity of about 0.055 (see U.S. Pat. No. 3,076,798) derived from potato starch.

EXAMPLE VI

Forty two g. of sorbitol, 12 g. of gluconic acid, and 16 g. of a dextran having an average molecular weight of about 1,000 and an average intrinsic viscosity of about 0.02 are reacted with ferric hydroxide prepared in situ as described in Example 2. This dextran is prepared by acid hydrolization and precipitation of the neutralized solution with methanol, of a dextran having an average intrinsic viscosity greater than 0.1 at 25° C. (See U.S. Pat. No. 3,100,202). The dried brown amorphous product contains 20.3 percent by weight of iron. The product is very soluble in water producing aqueous solutions without leaving any insolubles. The product is also soluble in ethylene glycol and glycerol and is insoluble in most other organic solvents. Aqueous solutions prepared from this dry powder have a pH between 7.2 and 7.5 and when subjecting an aqueous solution of the product to electrophoresis at a pH of 7.4 or 8.6 the complex exhibits electrophoretically a homogenous negative charge.

EXAMPLE VII

A hydrogenated dextran having an average molecular weight of about 1,000 and an average intrinsic viscosity of about 0.02 is used as described in Example 6 in place of the dextran, in order to prepare a dry preparation containing 22.8 percent by weight of Fe. The hydrogenated dextran is obtained from a dextran as described in Example 6 by hydrogenation according to Example 1 and is non-reducing to the Somogyi reagent. The dry brown amorphous product obtained using the hydrogenated dextran of this Example in the procedure described in Example 6 is very soluble in water and forms clear solutions therein. It is also soluble in ethylene glycol and glycerol and insoluble in most other organic solvents. Aqueous solutions prepared from the dried product have a pH between 7.2 and 7.5 and when subjecting an aqueous solution to electrophoresis at a pH of 7.4 or 8.6, the complex exhibits electrophoretically a homogenous negative charge.

What is claimed is:

1. The process of preparing a therapeutically useful preparation of iron comprising a non-ionic ferric complex, which comprises subjecting 1 mol of iron III hydroxide in a reactive form selected from the group consisting of freshly precipitated iron —(III) hydroxide and iron —(III) hydroxide prepared in situ to reaction with about 2 mols of a complex forming agent consisting of sorbitol, gluconic acid and a polyglucose selected from the group consisting of the dextrins and dextrans having an average intrinsic viscosity of about 0.01 to about 0.025 at 25°C. and an average molecular weight of from about 500 to about 1,200 and of the hydrogenated dextrins and dextrans having an average intrinsic viscosity of about 0.01 to about 0.025 at 25°C. and an average molecular weight of from about 500 to about 1,200 and being substantially non-reducing to the Somogyi reagent, in a molar ratio of about 1.15 mols of sorbitol per about 0.40 mol of gluconic acid per 0.5 mol of polyglucose.

2. The process according to claim 1 which comprises heating 1 mol of freshly precipitated ferric hydroxide in a reactive form together with about 2 mols of the complex forming agent in an aqueous alkaline medium until the ferric hydroxide is dissolved.

3. The process according to claim 1 which comprises adding 2 mols of the complex forming agent to an acid aqueous solution of 1 mol of a ferric salt, adding slowly at about room temperature an alkali to the thus obtained acid solution until a pH of about 2.5 is reached, thereafter further adding an alkali thereto until a pH of 9.5 is reached, and heating the thus obtained alkaline solution to boiling for about 5 to about 30 minutes.

4. A therapeutically useful composition prepared according to the process of claim 1.

\* \* \* \* \*